(12) United States Patent
Knight

(10) Patent No.: US 10,614,651 B1
(45) Date of Patent: Apr. 7, 2020

(54) GOLF EQUIPMENT DISPENSER

(71) Applicant: Rodney W. Knight, Saint Cloud, MN (US)

(72) Inventor: Rodney W. Knight, Saint Cloud, MN (US)

( * ) Notice: Subject to any disclaimer, the term of this patent is extended or adjusted under 35 U.S.C. 154(b) by 0 days.

(21) Appl. No.: 16/275,210

(22) Filed: Feb. 13, 2019

Related U.S. Application Data

(60) Provisional application No. 62/630,200, filed on Feb. 13, 2018.

(51) Int. Cl.
*G07F 7/08* (2006.01)
*A63B 57/00* (2015.01)
*A63B 102/32* (2015.01)

(52) U.S. Cl.
CPC .............. *G07F 7/08* (2013.01); *A63B 57/00* (2013.01); *A63B 2102/32* (2015.10)

(58) Field of Classification Search
CPC ............. A47F 1/125; A47F 1/128; A47F 1/04
USPC ...................... 211/51, 59.2, 70.2, 104, 89.01
See application file for complete search history.

(56) References Cited

U.S. PATENT DOCUMENTS

| | | | |
|---|---|---|---|
| 2,629,499 A * | 2/1953 | Welshenbach | B65D 5/504 211/70.1 |
| 3,738,663 A | 6/1973 | Gentiluomo | |
| 3,778,067 A | 12/1973 | Gentiluomo | |
| 3,946,847 A | 3/1976 | Bock | |
| 4,029,136 A | 6/1977 | Jacoby | |
| 4,054,197 A | 10/1977 | Bock | |
| 4,126,217 A | 11/1978 | Bock | |
| 4,245,684 A | 1/1981 | Street et al. | |
| 4,915,221 A * | 4/1990 | Spangler | A63B 55/40 206/315.6 |
| 5,009,330 A | 4/1991 | Young et al. | |
| 5,191,978 A * | 3/1993 | Strader | A47B 81/00 206/315.2 |
| 5,213,364 A * | 5/1993 | Theckston | A63B 55/00 280/769 |
| 5,269,411 A | 12/1993 | Hong | |

(Continued)

FOREIGN PATENT DOCUMENTS

| DE | 3404971 A1 | 8/1985 |
|---|---|---|
| FI | 2818516 A1 | 6/2002 |

(Continued)

*Primary Examiner* — Gene O Crawford
*Assistant Examiner* — Ayodeji T Ojofeitimi
(74) *Attorney, Agent, or Firm* — Albert W. Watkins

(57) ABSTRACT

A golf club dispenser comprises a vending subsystem, an information panel, and a golf club dispenser. The vending subsystem is configured to vend at least one golf club to a golfer through one or more suitable payment methods. At least one gravity slide is adapted to receive a golf club on the back side of the dispenser, and to allow the golf club to slide forward and downward until dispensed at the front side. A discharge assistant adjacent to the front side is configured to selectively release the golf club from the at least one gravity slide responsive to a control signal from the vending subsystem. The discharge assistant in different embodiments may comprise a sequential solenoid activation, a helical screw, or a rotating sprocket. In addition to the discharge assistant, a similar apparatus is preferably provided as an inlet assistant adjacent to the back side of the dispenser.

20 Claims, 5 Drawing Sheets

(56) References Cited

U.S. PATENT DOCUMENTS

| | | | |
|---|---|---|---|
| 5,277,331 A | | 1/1994 | Barbaccia |
| 5,426,806 A | | 6/1995 | Johnson et al. |
| 5,565,845 A | | 10/1996 | Hara |
| 5,607,053 A | * | 3/1997 | Sumiyoshi ............. A63B 55/40 |
| | | | 206/315.2 |
| 5,931,317 A | | 8/1999 | Zusack et al. |
| 5,934,439 A | | 8/1999 | Kanoh et al. |
| 6,014,137 A | | 1/2000 | Burns |
| 6,085,937 A | | 7/2000 | Hutchinson et al. |
| 6,142,319 A | | 11/2000 | Kim |
| 6,196,385 B1 | | 3/2001 | Thompson et al. |
| 6,360,901 B1 | * | 3/2002 | Parham .................. A47F 7/285 |
| | | | 211/162 |
| 6,407,668 B1 | | 6/2002 | Beham |
| 6,868,975 B2 | | 3/2005 | Sells et al. |
| 6,885,998 B1 | | 4/2005 | Arduino |
| 2014/0047745 A1 | * | 2/2014 | Wildrick .................. A47F 1/04 |
| | | | 40/661.06 |

FOREIGN PATENT DOCUMENTS

| | | |
|---|---|---|
| GB | 2278062 A | 11/1994 |
| WO | WO 01/45800 A2 | 6/2001 |

\* cited by examiner

GOLF EQUIPMENT DISPENSER

CROSS REFERENCE TO RELATED APPLICATIONS

The present application claims the benefit of U.S. provisional patent application 62/630,200 filed Feb. 13, 2018 of like title and inventorship, the teachings and entire contents which are incorporated herein by reference.

BACKGROUND OF THE INVENTION

1. Field of the Invention

The present invention pertains generally to golf vending dispensers, and more particularly to support racks for golf clubs that include financial vending apparatus together with an automatic golf club discharge assistant and automatic return. In a preferred manifestation of the invention, both of the golf club discharge assistant and return are provided with integral locking mechanisms.

2. Description of the Related Art

Golf in all the various forms is one of those idyllic sports that enables nearly all individuals to participate in, which may be readily learned, and yet which offers challenge for even the most skilled and practiced. One of the attractive and challenging features of golf is the lack of a standardized playing area. A course may comprise nearly any arrangement and construction, which has led to many different types of courses that present different challenges, while in every case preserving the underlying challenge of striking the ball with a club to cause the ball to fall into the next hole on the course.

One of the very important strokes in golf, which can be particularly challenging and many times extremely entertaining, is known as the putt. In larger and more challenging courses, the putt is normally the last in a sequence of strokes, preceded typically by one or more of drives, approaches, and chips. While all preceding strokes are desired to sink the ball into the hole, in most instances it is the putt that finally accomplishes the objective.

In consideration thereof, there have been many practice systems and courses that have been designed around the putt. For both training and recreational purposes, courses and practice areas are often entirely dedicated to putting. On larger courses, there is almost always a putting green practice area for persons to work on their putt. Even in corporate offices there is a well-known cliche of the executive with a small putting practice aid in office. For family fun and entertainment, there are many highly entertaining miniature golf courses that use putters and obstacles to provide ample entertainment and challenge for children and adults alike.

Historically, to enable the general public to partake in golf, each golf course has required one or more attendants to rent the necessary equipment to the participants and to monitor the course. For larger facilities such as the common nine or eighteen hole golf courses, having a person on site is desirable. However, in the case of miniature golf, putting greens, and the like, the attendant is often only responsible for renting equipment. The attendant in such cases undesirably adds to the cost, while providing little other benefit.

In consideration thereof, in the field of golf, dispensing systems are well known, particularly for golf balls. Exemplary U.S. patents, the teachings which are incorporated herein by reference, include: U.S. Pat. No. 3,738,663 by Gentiluomo, entitled "Digital controlled golfball teeing apparatus"; U.S. Pat. No. 3,778,067 by Gentiluomo, entitled "Automatic golf ball teeing apparatus"; U.S. Pat. No. 3,946,847 by Bock, entitled "Golf ball vendor"; U.S. Pat. No. 4,054,197 by Bock, entitled "Golf ball vendor"; U.S. Pat. No. 4,126,217 by Bock, entitled "Golfball vending machine"; U.S. Pat. No. 5,009,330 by Young et al, entitled "Golf ball vending machine"; U.S. Pat. No. 5,277,331 by Barbaccia, entitled "Vending machine for dispensing spherical objects"; and U.S. Pat. No. 6,085,937 by Hutchinson et al, entitled 'Golf ball vendor' and 'alternate' product vendor".

Other systems provide remote rental of equipment through an Internet-based portal, the equipment which may then be provided upon arrival of the golfer. Exemplary U.S. patents, the teachings which are incorporated herein by reference, include: U.S. Pat. No. 5,934,439 by Kanoh et al, entitled "Automatic commercial article renting system"; U.S. Pat. No. 6,014,137 by Burns, entitled "Electronic kiosk authoring system"; and U.S. Pat. No. 6,885,998 by Arduino, entitled "Internet-based sports equipment rental method".

In addition, there have been many apparatuses that have been devised to secure and selectively release golf clubs from golf bags, and in some cases are provided to prevent undesirable theft of expensive clubs when the clubs are not being used. In other cases, artisans have expanded upon these dispensers to include selective delivery of a particular type of club from a golf bag based upon a golfer's request, in the manner of an automated caddy. Exemplary U.S. and Foreign patents and published applications, the teachings which are incorporated herein by reference, include: U.S. Pat. No. 4,029,136 by Jacoby, entitled "Selective golf club dispenser"; U.S. Pat. No. 4,245,684 by Street et al, entitled "Golf bag system"; U.S. Pat. No. 4,915,221 by Spangler, entitled "Carrier with rotary dispenser for golf clubs"; U.S. Pat. No. 5,565,845 by Hara, entitled "Warning golf bag for missing clubs"; U.S. Pat. No. 6,407,668 by Beham, entitled "Automatic golf club selecting device"; U.S. Pat. No. 6,142,319 by Kim, entitled "Locking device for securing golf clubs"; U.S. Pat. No. 6,196,385 by Thompson et al, entitled "Golf club locking device"; and GB 2,278,062 by Arkinson, entitled "Golf bag".

Other systems have been devised to facilitate rental of golf clubs using appropriate payment or identification techniques, with the clubs racked in either a single row or upon a carousel. Exemplary patents and published applications, the teachings which are incorporated herein by reference, include: DE 3,404,971 by Erzmoneit, entitled "Combined dispensing device for play media"; FR 2,818,516 by Filhol et al, entitled "Dispenser for golf clubs or billiard cues has support which holds article at angle, slide near top holding it in position, but causing it to swing down when it is released"; and WO 01/45800 by Esteve et al, entitled "Golf club dispenser".

Additional patents of varying relevance, the relevant teachings and contents which are incorporated herein by reference, include: U.S. Pat. No. 5,191,978 by Strader et al, entitled "Locker set for storing golf equipment"; U.S. Pat. No. 5,269,411 by Hong, entitled "Golf club holder"; U.S. Pat. No. 5,426,806 by Johnson et al, entitled "Sports equipment grip cleaner"; U.S. Pat. No. 5,931,317 by Zusack et al, entitled "Golf range facilitator"; and U.S. Pat. No. 6,868,975 by Sells et al, entitled "Revolving gun safety cabinet".

In addition to the foregoing patents, Webster's New Universal Unabridged Dictionary, Second Edition copyright 1983, is incorporated herein by reference in entirety for the definitions of words and terms used herein.

While particularly beneficial for the applications for which they have been devised, there remains a need for an apparatus that provides a renter ready and intuitive access to a golf club, with similar ready and intuitive club return, each with a minimum of parts and complexity. Further, such an apparatus will preferably provide a maximum of storage density.

SUMMARY OF THE INVENTION

In a first manifestation, the invention is a golf equipment dispenser. A vending subsystem is provided that is adapted to vend at least one golf club to a golfer. At least one gravity slide is adapted to receive a golf club on a first end and to dispense the golf club at a second end distal to the first end. A discharge assistant adjacent to the second end is configured to selectively release the golf club from the at least one gravity slide responsive to the vending subsystem.

In a second manifestation, the invention is a golf club dispenser. A housing has a back side having at least one inlet opening configured to permit a golf club to pass through and a front side having at least one outlet opening configured to permit the golf club to pass through, and an interior configured to securely contain the golf club. A vending subsystem has a controller configured to vend the golf club to a golfer. At least one conveyance extends from the housing back side to the housing front side and is configured to receive the golf club on a first end through the housing inlet and to dispense the golf club at a second end distal to the first end through the housing outlet.

OBJECTS OF THE INVENTION

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a golf vending apparatus that provides a renter ready and intuitive access to a golf club. A second object of the invention is to provide the renter similar ready and intuitive club return. Another object of the present invention is to accomplish the foregoing with a minimum of parts and complexity. An additional object of the invention is for the apparatus to provide a maximum of storage density. Yet another object of the invention is to facilitate the automated vending of alternative smaller size golf clubs in the event that a larger size is out of stock.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED AND ALTERNATIVE EMBODIMENTS

Figure 1:
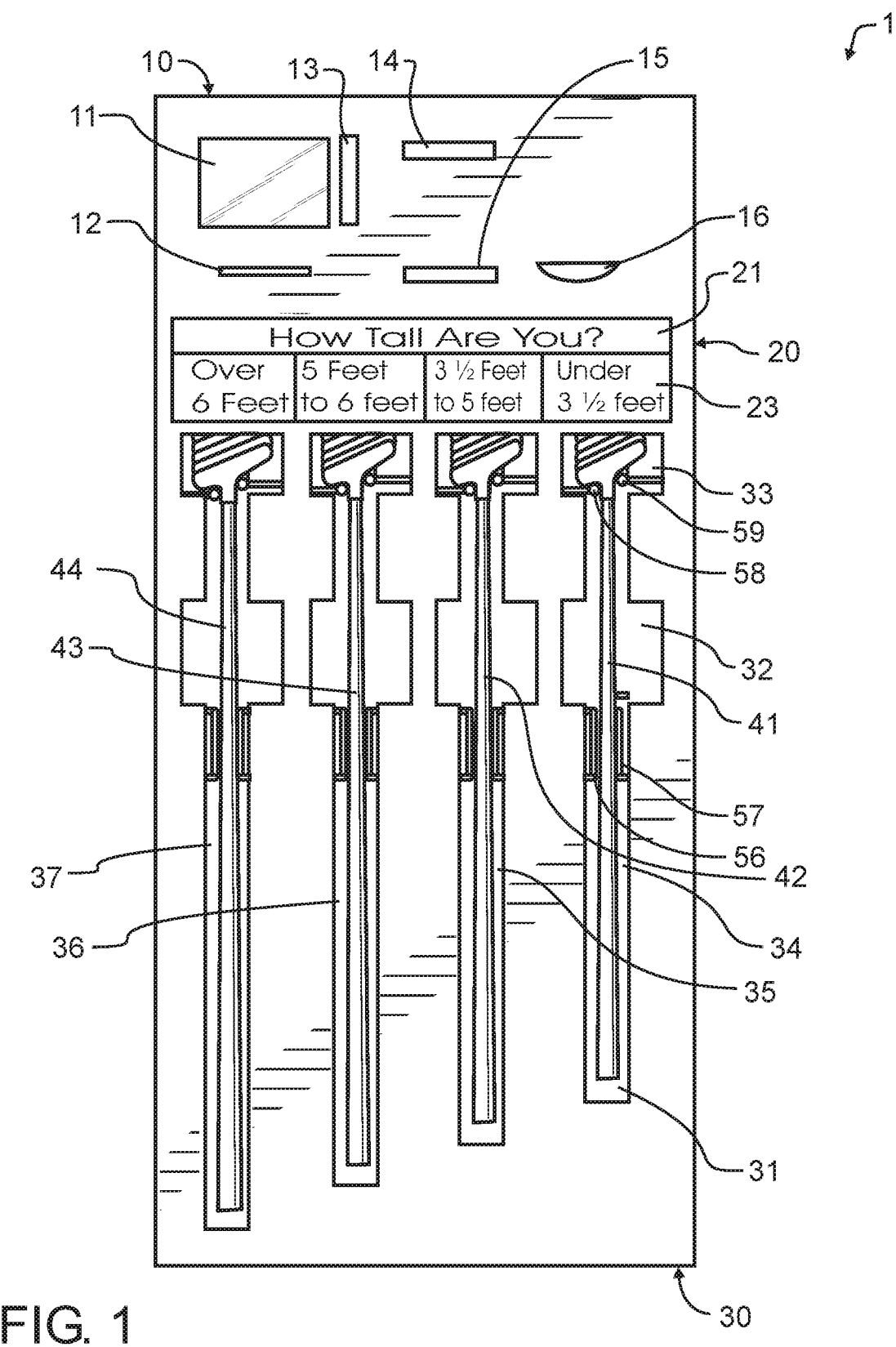
FIG. 1 illustrates a preferred embodiment golf equipment dispenser designed in accord with the teachings of the present invention from a front elevational view.

Manifested in the preferred embodiment illustrated in FIG. 1, the present invention provides a golf equipment dispenser 1 is comprised of a vending subsystem 10, an information panel 20, and a golf club dispenser 30.

Vending subsystem 10 may comprise any suitable vending components. In preferred embodiment golf equipment dispenser 1, these components include an interactive display screen 11 which is controlled to facilitate a financial transaction through the provision of various instructions. A receipt dispenser 12 provides a paper receipt at the conclusion of the transaction. A credit card reader 13 may include any suitable type of reader including but not limited to magnetic strip reader, electronic chip reader, or near-field communications device. A paper currency infeed 14 is adapted to receive and verify paper currency, while a bill dispenser 15 is provided to provide suitable change when so required. A coin return tray 16 is also provided and configured to provide any coin change required to complete a transaction. While these components are illustrated for exemplary purposes, more or fewer components may be provided, as deemed appropriate by a designer for a specific location and application. For exemplary and non-limiting purpose, vending subsystem 10 may include one or more of cash, coins or tokens, credit card processing, Internet-based reservations and transaction processing, or other suitable techniques. While financial transactions are representative of preferred embodiment golf equipment dispenser 1, in alternative embodiments other types of transactions are further contemplated, and may for exemplary purpose require such activities as mail, e-mail, or other type of registration in lieu of or in addition to monetary payment. In further alternative embodiments, vending subsystem 10 may comprise a simple button activation, such as a "start" button.

Information panel 20 may for exemplary and non-limiting purposes comprise pre-printed instructional or informational content as illustrated in FIG. 1. First information panel 21 poses the simple question "How tall are you?" Immediately beneath first information panel 21 lies second information panel 23, which is subdivided into four subpanels. Each of these subpanels provides one of the four possible answers, which are respectively "Under 3½ feet"; "3½ to 5 feet"; "5 feet to 6 feet"; and "Over 6 feet". While preferred embodiment golf equipment dispenser 1 divides second information panel 23 into four subpanels that divide the golfer's height into these four categories, in alternative embodiments there may be any number of panels and subpanels, from only one to as many as may be desired and for which space is available.

In an alternative embodiment, information panel 20 may comprise an electronic video display panel displaying like content. In further alternative embodiment, the electronic video display panel may display a variety of content, including instructions and helpful content, or, in yet further alternative embodiment various advertising or eye-catching displays configured to attract the attention of various persons.

Below information panel 20 is golf club dispenser 30, which is configured to dispense a suitable golf club such as one of golf clubs 41-44 responsive to suitable completion of a financial or other transaction through vending subsystem 10. As illustrated in FIG. 1, there are four golf club dispensing slots 34-37, each which comprises a golf club handle and shaft slot 31, an expanded golf club retrieval slot 32, and a golf club head opening 33 that in combination allow a golf club to pass through. In addition, expanded golf club retrieval slot 32 is preferably configured to permit a person to reach below the front surface of preferred embodiment golf equipment dispenser 1, and grasp the shaft of a one of golf clubs 41-44. While clubs 41-44 are the front clubs within each of the four golf club dispensing slots 34-37, as the plurality of putter heads in FIG. 1 illustrates, there will preferably be a plurality of clubs within each one of the four golf club dispensing slots 34-37.

Most preferably, the four subpanels of second information panel 23 divide the golfer's height into the aforementioned four categories, each which correspond directly with the one of the four golf club dispensing slots 34-37 immediately below, which, in turn and for exemplary and non-limiting purpose, are sized to accommodate golfers of different heights.

Figure 2:
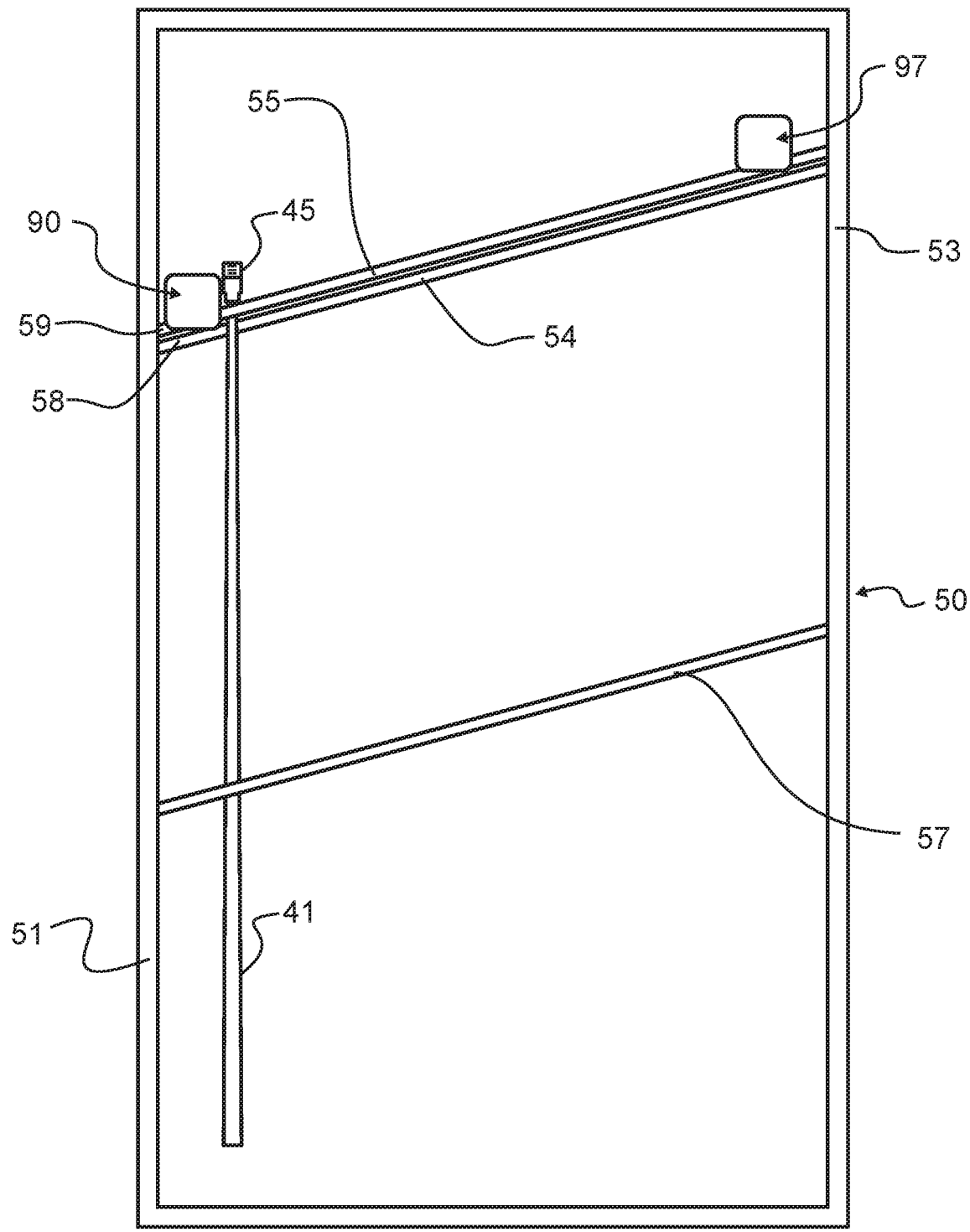
FIG. 2 illustrates a limited subset of the internal framework and components of the preferred embodiment golf equipment dispenser of FIG. 1 from a side elevational view.

FIG. 2 shows a limited subset of the internal framework and components of the preferred embodiment golf equipment dispenser 1, along with a single golf club 41 for illustrative purpose. As visible therein, framework 50 comprises any suitable number of support members. For exemplary and non-limiting purpose, structural framing components 51 are preferably provided onto which other functional members may be provided. In preferred embodiment golf equipment dispenser 1, a plurality of framing members together define the boundaries of each one of the four golf club dispensing slots 34-37.

First club head slide bar 54 is affixed at the end adjacent to the rear face of preferred embodiment golf equipment dispenser 1 to a slot framing member 53, while second club head slide bar 55 is affixed at the end adjacent to the rear face of preferred embodiment golf equipment dispenser 1 to a second slot framing member spaced laterally from slot framing member 53. First and second club head slide bars 54, 55 run generally parallel to each other, sloping in a generally downward direction from adjacent to the rear face of preferred embodiment golf equipment dispenser 1 toward the front. A small gap is provided between first and second club head slide bars 54, 55 that is sufficient to accommodate either the shaft or the portion of club head 45 adjacent to the shaft. This arrangement allows a club head 45 to rest on top of first and second club head slide bars 54, 55, and to slide along these slide bars, preferably solely under the influence of gravity, toward the front face of preferred embodiment golf equipment dispenser 1.

In one alternative embodiment, semi-cylindrical grooves may be provided in club head 45 that are configured to engage with and slide upon first and second club head slide bars 54 and 55. Nevertheless, the arrangement and positioning of first and second club head slide bars 54 and 55 is in preferred embodiment golf equipment dispenser 1 preferably selected in combination with golf clubs 41-44 to not require any customization of the club heads.

While first and second club head slide bars 54, 55 support club head 45 in the proper position, absent further support the club shaft and handle might rotate undesirably and get entangled with the internal portions of preferred embodiment golf equipment dispenser 1. To instead ensure that the clubs stay within and travel smoothly from the rear face to the front face of preferred embodiment golf equipment dispenser 1, additional guides are provided by first club shaft guide bar 56 and second club shaft guide bar 57. Like first and second club head slide bars 54 and 55, first and second club shaft guide bars 56, 57 are generally parallel to each other. They are also slightly spaced apart by a distance sufficient to allow the shaft or handle of a golf club to pass between.

In preferred embodiment golf equipment dispenser 1, the ends of first and second club head slide bars 54 and 55 will protrude slightly beyond the associated framework, defining protruding end 58 of first club head slide bar 54 and protruding end 59 of second club head slide bar 55, to help support the club until it is fully removed from the associated golf club dispensing slot 34-37. The slope of protruding ends 58, 59 may be the same as, or different from the slope of club head slide bars 54, 55.

Also visible in FIG. 2 is discharge assistant 90, which is preferably provided to selectively control the release of only one of golf clubs 41-44 at a time. An inlet assistant 97, of like or similar construction to discharge assistant 90, will also preferably be provided.

The details and operation of discharge assistant 90 are illustrated in FIGS. 3-6. Discharge assistant 90 preferably comprises a pair of electromagnetic solenoids 91, 92, which in their de-energized states have the armature extended through the incorporation of an internal spring. While solenoids are preferred owing to their simplicity and reliability, in alternative embodiments various other like or similar apparatuses may be used. For exemplary purposes only and not solely limiting the present invention thereto such apparatus as linear motors, various hydraulic and pneumatic devices, and the like may serve as functional equivalents in various alternative embodiments.

Figure 3:
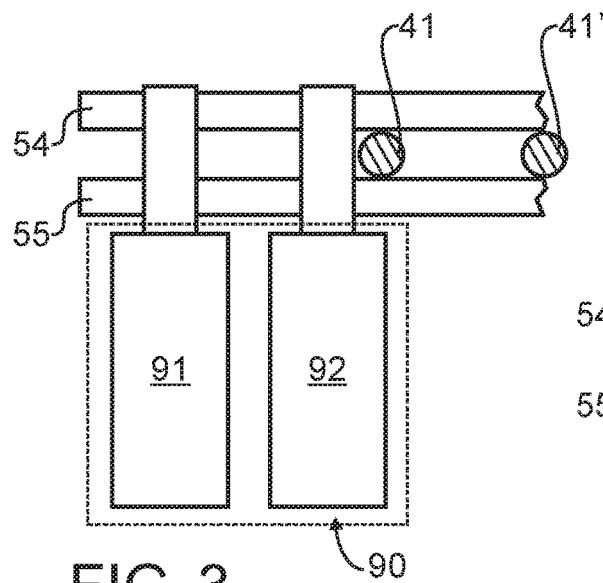
FIGS. 3-6 illustrate sequential operation of the preferred embodiment discharge assistant from top plan view.
Figure 4:
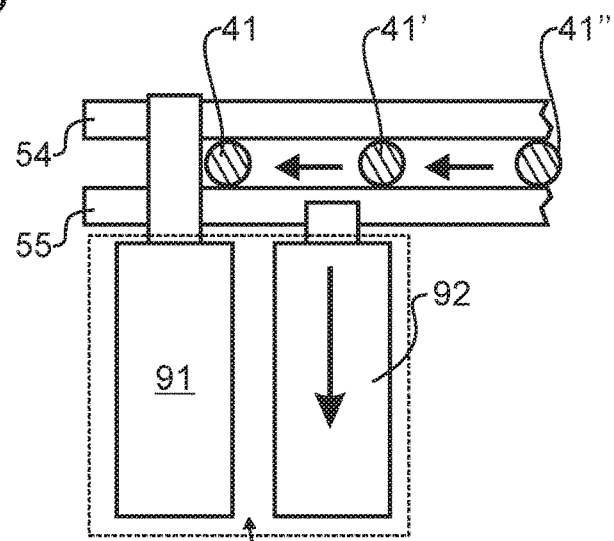

When electricity is applied thereto, solenoids 91, 92 will draw the armature in, such as illustrated by solenoid 92 in FIG. 4. In FIG. 3, both solenoids 91, 92 are in their de-energized states, blocking golf clubs 41, 41' from sliding down slide bars 54, 55 toward protruding ends 58, 59. Note that this position also prevents a person from grasping golf club 41 through retrieval slot 32 and removing the club therefrom.

Once a particular size club has been selected and payment received through vending subsystem 10, solenoid 92 will be energized. As illustrated in FIG. 4, this permits club 41 and all additional clubs suspended from slide bars 54, 55 to slide down toward protruding ends 58, 59. Note that at this time in the sequence, none of the clubs may be removed. Next, and in this order, solenoid 92 will be de-energized, and then solenoid 91 will be energized, resulting in the positioning shown in FIG. 5. It is at this point that club 41 may be removed from protruding ends 58, 59. Finally, solenoid 91 will be de-energized, and since solenoid 92 has already been de-energized, this will return discharge assistant 90 to the same position as that of FIG. 3, but with exactly one golf club 41 removed therefrom.

In some alternative embodiments, one or more sensors may be provided to verify or validate presence and proper movement of golf clubs within preferred embodiment golf equipment dispenser 1. Such sensors may be of any suitable type, for exemplary and non-limiting purpose including but not limited to optical, ferromagnetic, Hall-effect, conductivity, and mechanical switch sensors.

Figure 5:
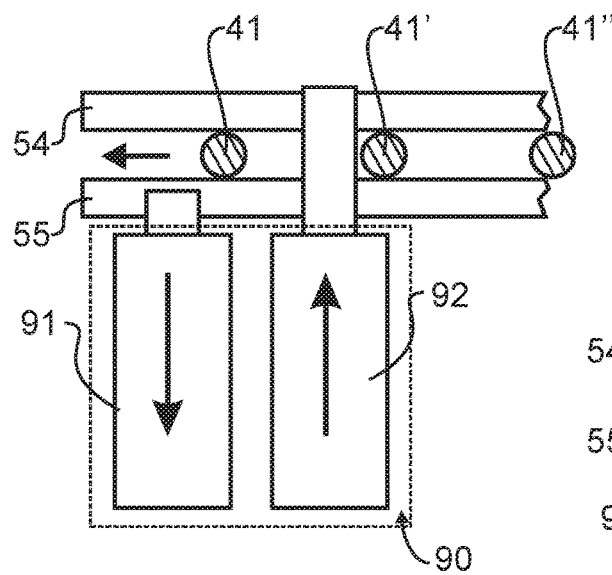
Figure 6:
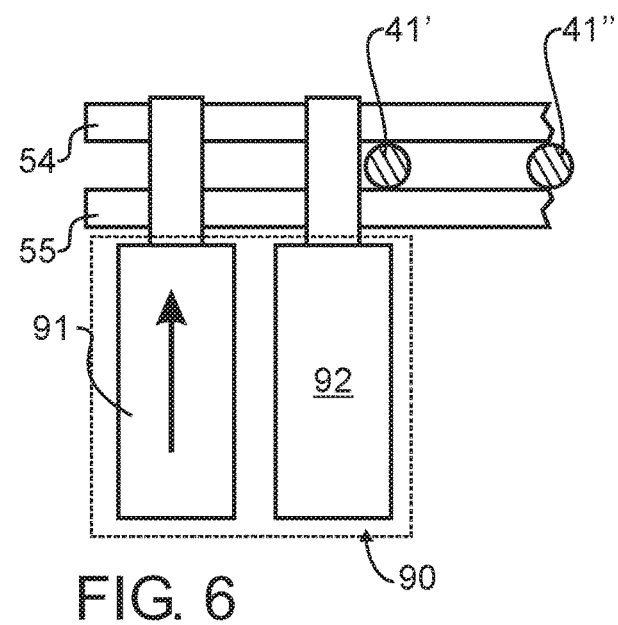

In the illustrated sequence, the position of clubs and solenoids of FIG. 3 is described herein above as the idle state between vending cycles. However, in alternative embodiments alternative sequencing may also be used. For exemplary and non-limiting purpose, the positioning of the clubs illustrated in FIG. 5 may be used as the idle state. While FIG. 5 illustrates solenoid 91 retracted, it will be apparent that until solenoid 91 is in fact retracted, club 41 will be captured by solenoid 91. Consequently, a sensor adjacent to the position of club 41 in FIG. 5 can confirm presence (and therefore availability) of a club 41 to be dispensed. In such alternative embodiment, when vending subsystem 10 generates an appropriate dispensing command signal confirming payment, solenoid 91 will be energized, and the positioning exactly as illustrated in FIG. 5 will be generated. In such case, club 41 will be removed by the renter, and the sensor will detect removal of club 41. At this moment, the dispensing of the single club will have been accomplished, and solenoid 91 may then be de-energized, as illustrated in FIG. 6. The sequences of FIGS. 3, 4, and the de-energization of solenoid 92 of FIG. 5 may then be repeated. This once again leads to the steady state, with both solenoids de-energized and ready for the next club dispense signal.

In some instances, there might not be sufficient clubs of one ore even several sizes stored within preferred embodiment golf equipment dispenser 1 to meet the immediate rental demands. In such case, and with the alternative embodiment configuration just discussed using a sensor to detect the presence or absence of a club 41 between the armatures of solenoids 91, 92, a suitable electric or electronic controller in one alternative embodiment is configured to respond to the absence of a club 41 between the armatures. In one embodiment, when no club is present, the solenoids may be cycled through the sequence outlined herein above, with the possibility that a second cycling of the solenoids may allow a club to slide into the proper position. If so, then that club may be dispensed, as already described herein above. If no club presence is detected, and again in accord with one embodiment of the invention, the solenoids may be cycled several more times.

After at least one cycle of the solenoids fails to position a club between the armatures of solenoids 91, 92, the controller may then revert to dispensing the next smaller size club. While the next smaller club may not be ideal, a renter may still use the club and enjoy the course with only slight inconvenience. This defaulting to the next smaller size may be continued up and until there are no more smaller clubs remaining. While not preferable, in some alternative embodiments the controller will also default to larger clubs, if no equal or smaller clubs are available.

As maybe apparent, other combinations of both the number and sequencing of solenoids may be provided, depending upon factors which will be understood by those skilled in the art upon a reading of the present disclosure.

While the armatures of solenoids 91, 92 are illustrated as terminating at a transverse cut plane, in some alternative embodiments the tip of the armature distal to the windings may be shaped to improve operation with the golf clubs. For exemplary and non-limiting purpose, in alternative embodiments the armature may be provided with a spherical, rounded, or conical end distal to the windings.

As noted herein above, a like or similar inlet assistant 97 may similarly have a pair of solenoids operating in the same or similar sequence. Initiation on the inlet side may be triggered by sensors, or may alternatively be triggered by a switch or the like. While the back side of preferred embodiment golf equipment dispenser 1 has not been illustrated, it will be understood to mirror the openings and slots 31-37 found on the front side illustrated in FIG. 1, but of course elevated above those on the front side to accommodate the elevation change of slides 54, 55.

Figure 7:
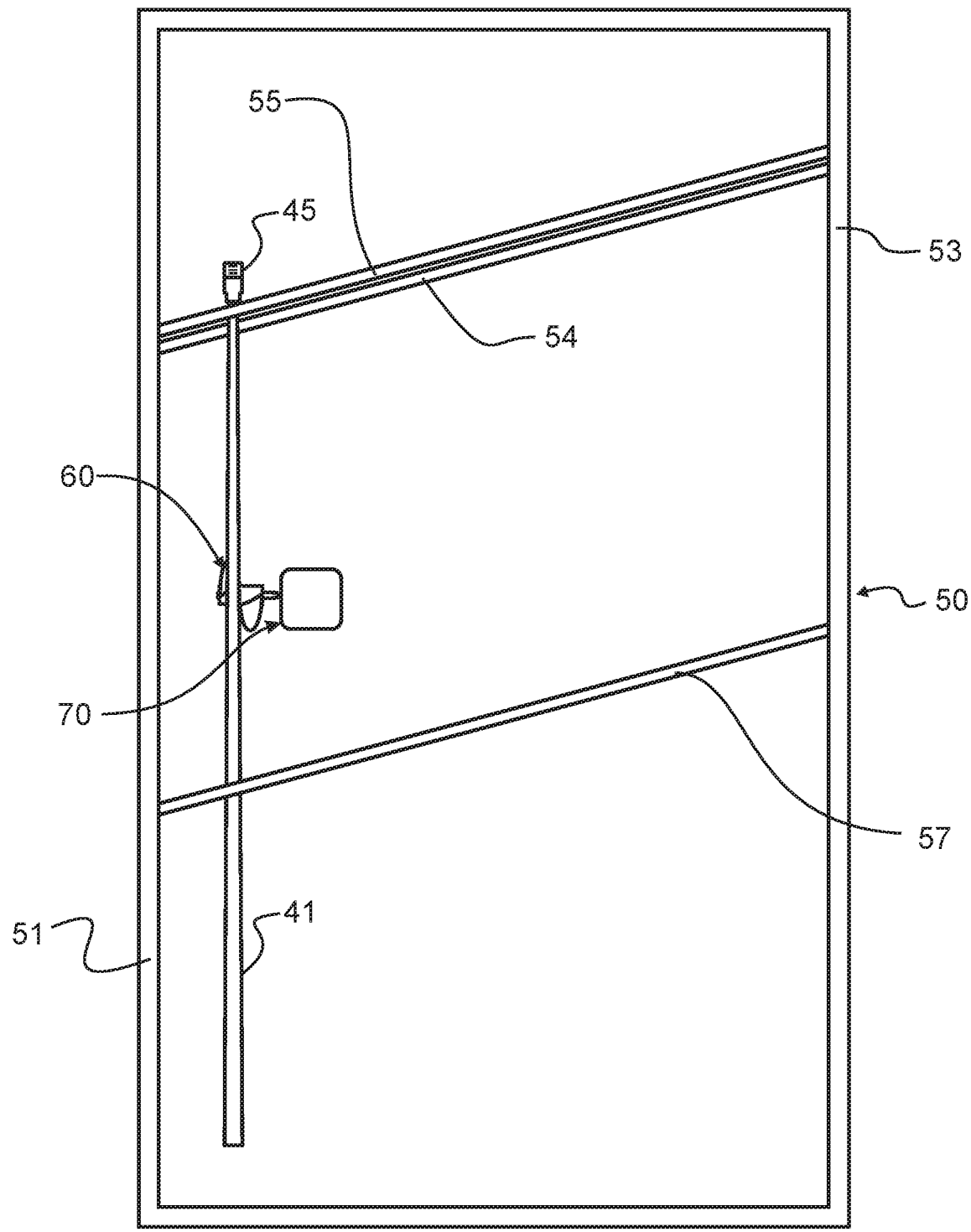
FIG. 7 illustrates a limited subset of the internal framework and components of the preferred embodiment golf equipment dispenser of FIG. 1 from a side elevational view, showing a first alternative embodiment discharge assistant.

Visible in FIG. 7 is a first alternative embodiment discharge assistant 60, which is preferably provided to selectively control the release of only one of golf clubs 41-44 at a time. Wrapped preferably in a helical manner about hub 61 is helical thread 62 that has a leading termination 64 and trailing termination 63. One full rotation of rotary drive shaft 71 will cause hub 61 to also complete a full rotation. This in turn will cause a golf club shaft that starts in the position of FIG. 7 to be pushed forward from between trailing termination 63 and leading termination 64 as illustrated in FIG. 7 to a position that is only in contact with trailing termination 63. During that same rotation of hub 61, if there are additional clubs sliding along first and second club head slide bars 54, 55, then the club next closest to the front of preferred embodiment golf equipment dispenser 1 will be moved to the position between trailing termination 63 and leading termination 64.

Club 41 in FIG. 7 is held securely between first and second club head slide bars 54, 55 and also between first and second club shaft guide bars 56, 57. These in combination with discharge assistant 60 lock club 44 into place until the full rotation of rotary drive shaft 71 has been initiated. In other words, discharge assistant 60, first and second club head slide bars 54, 55 and first and second club shaft guide bars 56, 57 all combine to lock and not release club 44 until properly vended.

While not separately illustrated in this "stripped down" FIG. 7, it will be understood that similar components 52-71 will be provided for each one of the four golf club dispensing slots 34-37.

Control of the rotation of rotary drive shaft 71 and discharge assistant 60 will preferably be provided at least in part from a suitable electric or electronic controller such as is commonly found in vending subsystem 10, or vending subsystem 10 in further combination with information panel 20. When a golfer uses vending subsystem 10 to rent one or more golf clubs, they may in the preferred embodiment enter into vending subsystem 10 the number and lengths of golf clubs desired. In such case, vending subsystem 10 is configured to sequentially release each club of appropriate length to the golfer. As the discharge assistant 60 for the appropriate one of four golf club dispensing slots 34-37 completes a single full rotation, one club will be shifted forward along first and second club head slide bars 54, 55 onto protruding ends 58, 59. In this position, the golf club may freely be removed from preferred embodiment golf equipment dispenser 1. Once the first club has been dispensed, any additional clubs may next be dispensed until all vended clubs have been dispensed.

In those alternative embodiments where event information panel 20 comprises an electronic video display panel, information panel 20 may also be used to allow a user to select which size of club to be dispensed. In such alternative embodiments, vending subsystem 10 may be used to rent a particular number of golf clubs, without consideration for length. Next, the user may be prompted to touch one of the four subpanels of second information panel 23 for each golf club rented. Touching the subpanel can then be used to initiate rotation of the associated rotary drive shaft 71.

If the only difference between each of golf clubs 41-44 is in the combined length of the club handle and shaft, then it will be apparent that in some instances an errant golfer might accidentally be confused and place a shorter golf club in the wrong one of the four golf club dispensing slots 34-37. It will be apparent that a longer golf club will not be able to be inserted into a shorter slot. However, the inverse is not true. Consequently, golf club 41 can be placed in any of the four golf club dispensing slots 34-37. If one or more golf clubs 41 are placed in any of slots 35-37, when these shorter clubs reach the front of the respective slot, the short club would then prevent access by a golfer to the club of the proper length. If there are enough clubs to accommodate a particular time interval between inspections by a maintenance person, then the maintenance person can rearrange clubs as required. However, it may be preferable to provide other means to ensure that the clubs are arranged correctly. While a number of techniques are contemplated in various alternative embodiments herein, for exemplary purposes one approach is to key the golf club heads 45 in a manner that is inverse to the slots and shaft lengths. This maybe accomplished, again for exemplary and non-limiting purpose, by sizing the head of the shortest club 41 to be the largest in a direction transverse to the shaft. In such case, then the golf club head opening 33 will be largest in a direction transverse to the golf club shaft (horizontal direction as illustrated in FIG. 1) for golf club dispensing slot 34, and will get progressively smaller for each of the remaining golf club dispensing slots 35-37. In an alternative embodiment, the angle between the head of the shortest club 41 may be most offset from perpendicular to the shaft, and each of clubs 42-44 will be progressively closer to perpendicular. In this alternative embodiment, the golf club head opening 33 will be largest in a direction parallel to the golf club shaft for golf club dispensing slot 34 (vertical direction as illustrated in FIG. 1), and will get progressively smaller for each of the remaining golf club dispensing slots 35-37. Using either of these alternative embodiments, only the correct one of golf clubs 41-44 will fit into the associated one of the four golf club dispensing slots 34-37. From the foregoing discussions, it will be apparent to those skilled in the mechanical arts to provide other techniques to "key" the clubs in other alternative embodiments to ensure that the clubs can only be inserted into the proper associated slot.

Figure 8:
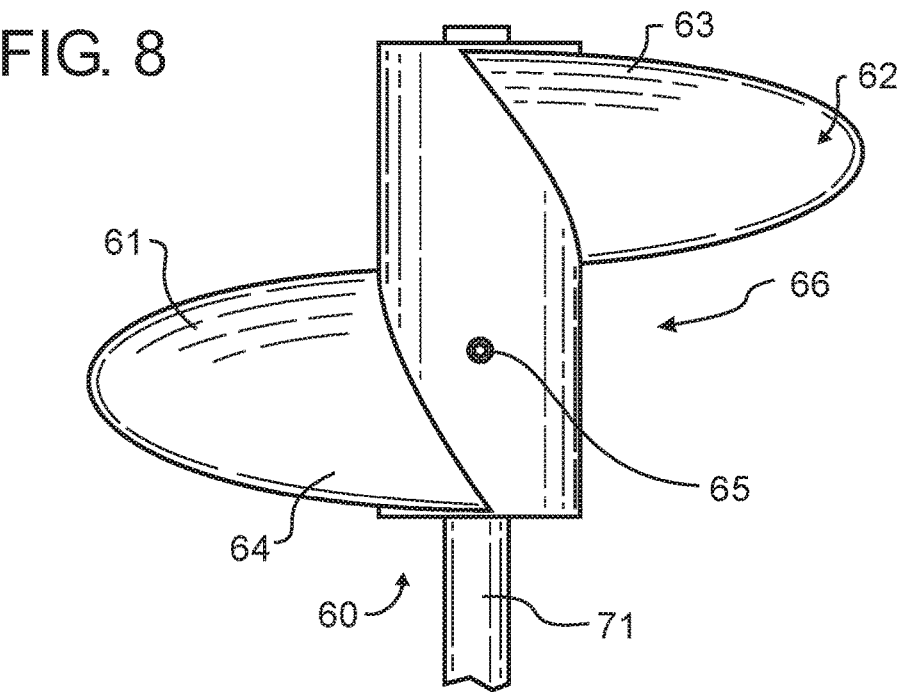
FIG. 8 illustrates a first alternative embodiment discharge assistant for use in combination with the preferred embodiment golf equipment dispenser of FIG. 1 from a top plan view.

FIG. 8 illustrates the preferred embodiment discharge assistant 60 from an enlarged view. In addition to the features already described herein above with reference to FIG. 7, two additional features become apparent. First, a small set screw 65 may be provided to affix discharge assistant 60 to rotary drive shaft 71, though any other suitable technique to fasten these two components together may be provided. The second feature is the gap 66 between trailing termination 63 of helical thread 62 and leading termination 64. A golf club such as club 41 of FIG. 7 will be returned by being inserted between first and second club head slide bars 54, 55 and first and second club shaft guide bars 56, 57 adjacent to the rear face of preferred embodiment golf equipment dispenser 1. The golf club will then under the sole force of gravity slide down first and second club head slide bars 54, 55 until the shaft of the golf club contacts leading termination 64 of helical thread 62. The golf club will rest there until rotary drive shaft 71 is rotated. A single rotation of rotary drive shaft 71 will cause the golf club shaft to shift from solely in contact with leading termination 64 to the gap 66 between leading termination 64 of helical thread 62 and trailing termination 63. Finally, another full rotation of rotary drive shaft 71 will cause the golf club shaft to shift from gap 66 into sole contact with trailing termination 63. At this same time as the golf club shaft shifts from gap 66 into sole contact with trailing termination 63, club head 45 will also shift from sliding down first and second club head slide bars 54, 55 to a position suspended from protruding ends 58, 59. In this position, the golf club may freely be removed from preferred embodiment golf equipment dispenser 1.

Figure 10:
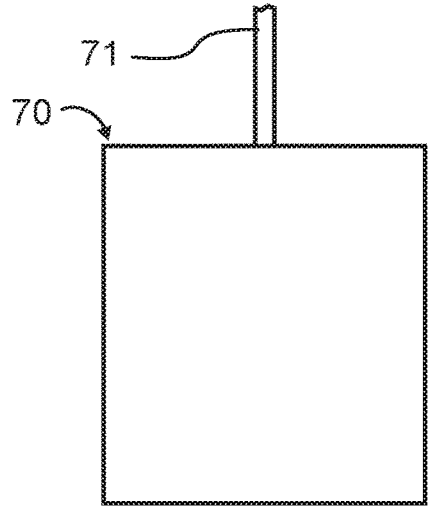
FIG. 10 illustrates a preferred embodiment motor for use in combination with the alternative embodiment discharge assistants of FIGS. 8 and 9 from top plan view.

For exemplary and non-limiting purposes only, FIG. 10 illustrates one preferred embodiment motor 70 having a rotary drive shaft 71 that may be used in combination with the preferred embodiment golf equipment dispenser 1.

Figure 9:
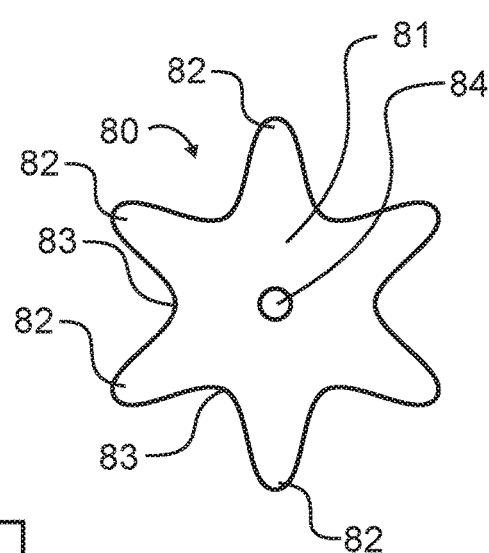
FIG. 9 illustrates a second alternative embodiment discharge assistant for use in combination with the preferred embodiment golf equipment dispenser of FIG. 1 from a top plan view.

FIG. 9 illustrates a first alternative embodiment discharge assistant 80 that may be used within preferred embodiment golf equipment dispenser 1. Discharge assistant 80 comprises a sprocket 81 having a plurality of teeth 82 that are configured to rotate about a central hollow axis 84. Hollow axis 84 is configured to receive a rotary drive shaft such as rotary drive shaft 71 therein. However, while discharge assistant 60 is configured with a horizontal axis rotary drive shaft 71, discharge assistant 80 requires that rotary drive shaft 71 rotate about a vertical axis. In such orientation, a single golf club shaft will fit within the indentations 83 between adjacent teeth 82. While the particular number of teeth 82 formed in sprocket 80 is not critical to the present invention, in the embodiment illustrated in FIG. 6 there are six teeth. In such case, then a sixty degree rotation about rotary drive shaft 71 will advance a golf club from a position trapped between indentation 83 and the associated first and second club head slide bars 54, 55 and first and second club shaft guide bars 56, 57 to a position suitable for manual retrieval by a golfer.

While not separately illustrated, in addition to the foregoing, in alternative embodiments contemplated herein an inlet assistant may be provided adjacent to and just below the upper end of first and second club head slide bars 54-55. For exemplary and non-limiting purpose, the inlet assistant may take a configuration similar to that of the alternative embodiment discharge assistant 80, and function in a manner very similar thereto. The exception to the manner of function arises in the lack of need for a drive motor 70, which in these alternative embodiments would instead be replaced by a one-way clutch well known in the mechanical arts, and commonly found on the rear axle of a bicycle. Such a one-way clutch will, again as is well-known in the mechanical arts, allow the inlet assistant of construction like discharge assistant 80 to rotate in a first direction substantially freely, to permit a golf club such as clubs 41-44 to be inserted at the rear face of preferred embodiment golf equipment dispenser 1, opposite to that illustrated in FIG. 1 and visible to the right in FIG. 3. Once inserted, the club will slide along first and second club head slide bars 54-55 until the club either encounters discharge assistant 60, or another club already in place and trapped by first and second club head slide bars 54-55. In the event there are already a large number of clubs in place and trapped by first and second club head slide bars 54-55, the most recently inserted club might be accessible by a person at the rear of preferred embodiment golf equipment dispenser 1. In such case, the inlet assistant with one-way clutch will not rotate in a direction which would allow the club to removed from the rear of preferred embodiment golf equipment dispenser 1.

While also not separately illustrated, in alternative embodiments contemplated herein individual clubs may further be provided with electronically readable indicia. For exemplary and non-limiting purpose, such electronically readable indicia may include RF-ID tags, bar codes, and any other suitable means to identify each club individually.

Where this indicia is uniquely associated with a single golf club, the apparatus in accord with the present invention may then be able to individually track each golf club. In the event one or more of the clubs are not returned, the apparatus may then identify which renter failed to return the rented equipment. In the case of credit card and Internet-based transactions, this identification may also in further alternative embodiments be used to bill the renter for the unreturned equipment.

In alternative embodiments where electronically readable indicia is provided to identify each club individually, such indicia may also be used in further combination with the inlet assistant discussed herein above to control admission of a particular golf club 41-44 into a particular one of golf club dispensing slots 34-37, to ensure return of the club into the proper dispensing slot. In these alternative embodiments, a sensor adjacent to the inlet may be used to identify the club and determine whether the club is appropriate for the slot. If so, then the inlet assistant may be allowed to rotate, such as by the release of a solenoid pin inserted into the inlet assistant or other braking means. If the club is not appropriate for the slot, then the inlet assistant would remain locked.

As may be apparent, in such an alternative embodiment where electronic means are used to determine proper return placement of a club into a slot, the mechanical keying means discussed above that provides for proper return may be provided, or in further alternative embodiments may not be required. In such case, other than differing shaft lengths and electronically readable indicia, the golf clubs 41-44 could then be identical, and the golf club head openings 33 for each of golf club dispensing slots 34-37 could also be identical.

In addition to the sensor required to read the electronically readable indicia, in further alternative embodiments various other sensors and devices may be provided, based upon the intended application, costs and other factors that will readily be determined by a designer. For exemplary and non-limiting purpose, such sensors may include inductive or optical proximity sensors within or adjacent to the path that the clubs traverse within each of the golf club dispensing slots 34-37. Proximity sensors may be used to detect proper traversing of the clubs and fill level of the machine. Other sensors that may be provided, again for exemplary and non-limiting purpose, include tilt and vibration sensors that may be used to detect intentional damage or attempts at theft, and video cameras that may be used for remote monitoring and security purposes. In such cases, a wired or wireless communications channel will also preferably be provided.

In additional alternative embodiments, the present golf club dispenser 1 may further comprise apparatus operative to provide for the rental of other equipment, including but not limited to golf balls and golf tees. Further, in view of the foregoing description and illustrations, the present invention may be used not only for rental purposes, but also is well equipped for retail sales. Additionally, while the present disclosure is directed to golf clubs, and more particularly to golf putters, it will be apparent that other types of golf clubs may be provided. In addition, it will be apparent that with only limited modification, the present invention may also be adapted to other apparatus besides golf clubs.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A golf equipment dispenser, comprising:
    a vending subsystem configured to vend at least one golf club to a golfer;
    at least one gravity slide configured to receive a golf club on a first end and to dispense the golf club at a second end distal to said first end; and
    a discharge assistant adjacent to said second end configured to selectively release the golf club from said at least one gravity slide responsive to said vending subsystem.

2. The golf equipment dispenser of claim 1, wherein said discharge assistant further comprises a sprocket, and a motor coupled to rotate said sprocket.

3. The golf equipment dispenser of claim 1, wherein said discharge assistant further comprises a first solenoid and a second solenoid, said second solenoid closer to said second end of said slide than said first solenoid.

4. The golf equipment dispenser of claim 1, further comprising at least one protruding end protruding from and terminating said at least one gravity slide adjacent to said second end.

5. The golf equipment dispenser of claim 1, further comprising at least one inlet assistant adjacent to said first end configured to selectively receive the golf club onto said at least one gravity slide and block subsequent removal from said first end.

6. The golf equipment dispenser of claim 1, wherein said at least one gravity slide comprises a pair of generally parallel and spaced apart members upon which a head of said golf club slides under the influence of gravity.

7. The golf equipment dispenser of claim 6, wherein said at least one gravity slide further comprises a second pair of generally parallel and spaced apart members also spaced from said first pair of generally parallel and spaced apart members and configured to retain a handle of said golf club in alignment while said golf club slides under the influence of gravity.

8. The golf equipment dispenser of claim 1, wherein said discharge assistant further comprises a helical thread about a shaft, and a motor coupled to rotate said helically threaded shaft.

9. The golf equipment dispenser of claim 8, wherein said helical thread defines one complete turn about said shaft, and said motor is configured to rotate said helically threaded shaft through said one complete turn to discharge a golf club therefrom.

10. The golf equipment dispenser of claim 1, further comprising a housing defining a space generally interior to said housing and a space exterior thereto, said housing having a back side having at least one inlet opening configured to permit said golf club to pass through from said exterior space to said at least one gravity slide first end and a front side having at least one outlet opening configured to permit said golf club to pass through from said gravity slide second end to said exterior space, said housing interior configured to securely contain said golf club.

11. The golf equipment dispenser of claim 10, wherein said housing front side is generally parallel to and displaced from said housing back side and said at least one gravity slide extends generally linearly therebetween.

12. The golf equipment dispenser of claim 10, wherein said at least one outlet opening further comprises a retrieval slot enlarged relative to a golf club handle and shaft slot and configured for a renter to grasp said golf club shaft through said retrieval slot.

13. The golf equipment dispenser of claim 10, wherein said at least one gravity slide further comprises a plurality of gravity slides, and said at least one inlet opening further comprises a plurality of inlet openings of varying dimension configured to selectively sort a plurality of golf clubs based upon a dimension of individual ones of said plurality of golf clubs.

14. The golf equipment dispenser of claim 13, wherein said vending subsystem further comprises a controller configured to vend said golf club to a golfer when said golf club is present and available for vending, said controller further configured to vend a second golf club of a size different from said golf club when said golf club is unavailable for vending and when said second golf club is available for vending.

15. A golf club dispenser, comprising:
   a housing having a back side having at least one inlet opening configured to permit a golf club to pass through and a front side having at least one outlet opening configured to permit said golf club to pass through, and an interior configured to securely contain said golf club;
   a vending subsystem having a controller configured to vend said golf club to a golfer;
   at least one conveyance extending from said housing back side to said housing front side and configured to receive said golf club on a first end through said housing inlet and to dispense said golf club at a second end distal to said first end through said housing outlet.

16. The golf club dispenser of claim 15, wherein said conveyance further comprises a gravity slide.

17. The golf club dispenser of claim 15, further comprising a discharge assistant adjacent to said second end configured to selectively release said golf club from said conveyance responsive to said vending subsystem.

18. The golf club dispenser of claim 16, wherein said at least one gravity slide comprises a pair of generally parallel and spaced apart members upon which a head of said golf club slides under the influence of gravity.

19. The golf club dispenser of claim 17, further comprising at least one inlet assistant adjacent to said first end configured to selectively receive said golf club onto said at least one gravity slide and block subsequent removal from said first end.

20. The golf club dispenser of claim 17, wherein said discharge assistant further comprises a first solenoid and a second solenoid, said second solenoid closer to said second end of said slide than said first solenoid.

* * * * *